June 2, 1964  H. GREENTREE  3,135,358

TRACTOR-TRAILER BRAKING SYSTEMS AND OPERATING MECHANISM

Filed Jan. 17, 1963  4 Sheets-Sheet 1

INVENTOR
*Herbert Greentree*

BY
ATTORNEYS

June 2, 1964  H. GREENTREE  3,135,358
TRACTOR-TRAILER BRAKING SYSTEMS AND OPERATING MECHANISM
Filed Jan. 17, 1963  4 Sheets-Sheet 2

INVENTOR
*Herbert Greentree*

BY
ATTORNEYS

June 2, 1964     H. GREENTREE     3,135,358
TRACTOR-TRAILER BRAKING SYSTEMS AND OPERATING MECHANISM
Filed Jan. 17, 1963     4 Sheets-Sheet 3

INVENTOR
*Herbert Greentree*

BY

ATTORNEYS

June 2, 1964          H. GREENTREE          3,135,358

TRACTOR-TRAILER BRAKING SYSTEMS AND OPERATING MECHANISM

Filed Jan. 17, 1963          4 Sheets-Sheet 4

INVENTOR
*Herbert Greentree*

BY
ATTORNEYS

United States Patent Office 3,135,358
Patented June 2, 1964

3,135,358
TRACTOR-TRAILER BRAKING SYSTEMS AND OPERATING MECHANISM
Herbert Greentree, 8918 Palm St., Pine Grove Village, Lake Worth, Fla., assignor of one-half to Geraldine H. Greentree, Lake Worth, Fla.
Filed Jan. 17, 1963, Ser. No. 252,078
22 Claims. (Cl. 188—3)

The present invention relates to a braking system for tractor-trailer vehicles and more particularly to control means for applying the trailer brakes in proper sequence relative to the application of the tractor brakes.

The systems in use are of two general types, one being a purely hydraulic system and the other being a combination of hydraulic and electric systems wherein the hydraulic system is applied to the tractor while the electric system is used on the trailer. In each of these systems the trailer braking system is so intimately associated with the tractor braking system that a failure of the tractor braking system also results in a failure of the trailer braking system.

One example of a hydraulic electric system is that which is illustrated and described in United States Patent No. 2,260,641 to F. M. Reid, issued October 28, 1941. The tractor system comprises a master cylinder having a spring biased piston for creating a braking pressure through a piping system leading to a braking cylinder at each tractor wheel. Pistons in the wheel cylinders, likewise biased by springs, apply pressure against the brake shoes to decelerate the vehicle. The piping system usually includes hose connections between the piping system and two or more wheel cylinders that are subject to deterioration and breakage rendering the system ineffective.

The electric brake system is connected to the hydraulic system as by the connection of a controller to the same piping system. This controller includes a plunger, spring biased in one direction and pressure operated in the opposite direction. The plunger actuates a means for connecting the electric brake system to a source of electric current through a high resistance and for successively shorting out portions of the resistance as the brake pressure is increased.

As will be seen, failure of the pressure in the hydraulic system also results in a failure of the electric brakes. Also the proper sequence of operation of the two brake systems is hard to secure and maintain.

Systems designed to overcome the dependency of the electric brake system on the good working order of the hydraulic brake system have resulted in a separate and independent means, usually hand operated, being provided and located on or near the steering post. In case of failure of the hydraulic system on the tractor, the hand operated means may be operated to apply the trailer brakes. However, this poses a problem of operating two hand brakes at the same time and simultaneously steering the vehicle. The maximum amount of safety cannot be attained by a system of this kind. An example of this system is shown in United States Patent No. 2,454,-291 to W. F. Penrose, issued November 23, 1948.

A primary object of this invention is to overcome the many disadvantages of the prior art structures to provide a system that is safe and dependable.

Another object of this invention is the provision of a tractor-trailer brake system wherein the two systems are independent of the operability of each other.

Another object of this invention is to provide a trailer brake system that may easily and simply be associated with the tractor or car braking system without modification of the tractor brake system.

Still another object of the present invention is to provide a tractor-trailer brake system that may easily be adjusted for proper sequence of application of brakes and easily maintained in proper adjustment.

Other objects of the invention, its various advantages, and meritorious features will more fully appear from the following description, appended claims, and the accompanying drawings, wherein:

Figure 1:
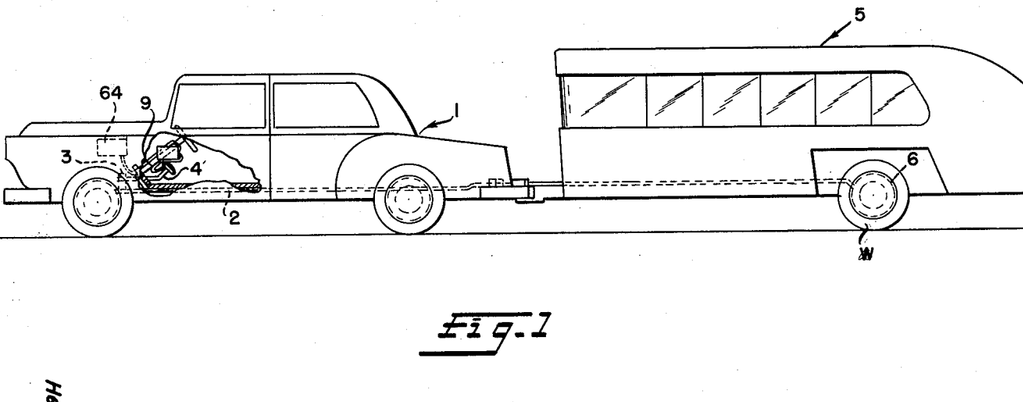
FIGURE 1 is a side elevational view of a tractor-trailer assembly wherein the tractor is an automobile and the invention is applied thereto.
Figures 2, 3:
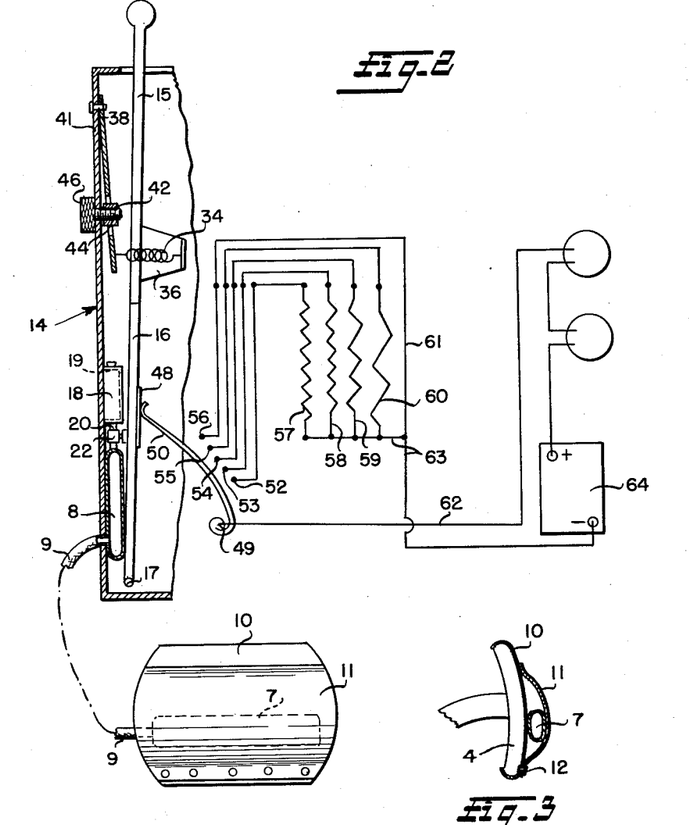
FIGURE 2 is an elevational diagrammatic view, partly in section of one embodiment of the invention.
FIGURE 3 is a diagrammatic elevational view partly in section disclosing the application of the control element of the FIGURE 1 embodiment of the brake pedal.

Referring to FIGURES 1 to 3, an automobile-trailer combination as illustrated, represents one form of tractor-trailer combination to which the invention is applicable. The automobile 1 is provided with its own conventional hydraulic brake system 2 having a foot pedal 4 for the actuation of the brakes through the medium of the hydraulic system. Such a system comprises a master cylinder 3 connected to the separate wheel cylinders by piping means with the brake pedal 4 connected to a piston (not shown) in the master cylinder. The trailer 5 is provided with an electrical brake system 6 having an electromagnet (not shown) at each of the trailer wheels W for applying the brakes thereto. The electrical brakes per se are conventional and form only an element of the system of which the present invention is concerned. Any type of electrical brake may be used on the trailer 5 and any type of brake system may be used on the automobile or tractor 1 so long as it includes a foot pedal actuator 4. The preferred mode of operation of the combined braking system is to have the trailer brakes applied slightly in advance of the application of the tractor brakes and in a manner such that greater brake application is simultaneously applied to the trailer after the tractor brakes are increasingly applied. It is also desirable to provide a system in which the trailer brakes can be independently applied, and one which is not dependent on the good working order of the tractor brakes.

The form of the invention disclosed in FIGURE 2 provides a hydraulic pulsator type trailer brake control system having a pair of expandable bulbs or chambers 7 and 8 connected by non-expandable tubing 9. While bulbs 7 and 8 are disclosed, it is to be understood other types of expandable chamber devices may be used in lieu thereof in the pulsator type system. The system is so arranged that when one of the bulbs is squeezed or flattened, the other bulb is expanded as it receives the liquid discharged from the first bulb. The expansion of the second bulb is restrained in all directions except one where it operates against a movable partition of the chamber that encloses the second bulb.

The system includes bulb 7 mounted upon the foot tread of the brake pedal 4 of the tractor or car drawing the trailer. Any type of means for positioning and maintaining the bulb on the brake pedal may be used. The example herein disclosed, includes arched base plate 10 of metal that tightly embraces the brake pedal 4 and serves to hold bulb 7 on the brake pedal tread plate. Bulb 7 rests against plate 10 and is held thereto by a metal plate 11 hingedly riveted or otherwise fixed at 12 along one of its edges to plate 10. Bulk 7 is made of a material that is readily deformed by pressure applied to its surface, for example, vinyl plastic. The bulb is connected by relatively non-expandible tubing 9 to a similar bulb 8, housed in a walled chamber 14 provided with a movable partition wall 16. Chamber 14 is mounted on the dash or on the steering post of the tractor or car with a handle-like extension 15 of partition wall 16 extending through a wall thereof for a purpose to be presently pointed out.

As pressure is applied to bulb 7 the fluid in this bulb is forced out along tubing 9 into bulb 8 to apply a force to or against the movable wall 16, causing it to be moved counterclockwise outwardly as viewed in FIGURE 2 around its pivot connection 17. The amount of movement of wall 16 is in direct proportion to the deformation of bulb 8.

To fill and to replenish liquid within the pulsator system, there may be provided a reservoir 18 having a filling opening 19 at the top and a connection 20 at its lower end in communication with the bulb 8. The connection 20 preferably employs a cut-off valve 22 to prevent fluid returning to the reservoir once the system is fully charged.

The movable wall 16 and its extension 15 provides the trailer brake controller and forms a means for hand manipulation of the trailer electric brakes as will presently appear. Wall 16 is biased by spring means 34 attached at one end to ear 36 affixed to wall 16 and at the other end to a second lever 38 pivoted at 40 to stationary wall 41 of chamber 14. Lever 38 has a threaded nut 42 horizontally pivotally mounted therein intermediate the ends of the lever. Nut 42 is engaged by screw 44 extending through wall 41 with its knurled head 46 abutting the outer face of wall 41. Rotation of screw 44 in one direction draws wall 16 toward wall 41 to increase the tension of spring 34 and take up any lost motion in the bulb operating system and to force movable wall 16 against bulb 8. Rotation of screw 44 in the opposite direction releases some of the tension on the spring thereby adjusting the amount of pressure required to expand bulb 8 and cause movement of wall 16.

Wall 16 also carries an insulating pad 48 for slidingly engaging the end of a spring contact 50 fixed at its other end to a post 49 supported in walled chamber 14. As wall 16 is moved in a clockwise direction by expansion of bulb 8, pad 48 pushes against the end of the spring contact 50 to deform it and cause it to come into successive engagement with a plurality of spaced contacts 52–56 fixedly mounted in walled chamber 14. Contacts 52–56 connect with resistors 57–61, each contact connecting with a separate resistor of different resistance. Spring contact 50 is connected through post 49, a lead 62 including the conventional magnets (not shown) of the trailer brake system 6 to one terminal of a supply of electric current 64, such as a battery. The circuit through the respective resistors 57–61 are all connected to a single buss 63 which in turn is connected to the other terminal, preferably the power terminal of battery 64, completing the electric circuit between the controller, source of electric current said the electro-magnetic brakes.

When pressure is applied to movable plate 11 on the face of the brake pedal 4, bulb 7 is first depressed, forcing fluid from it through the tubing 9 and into bulb 8. There the fluid exerts a pressure on movable wall 16 to cause wall 16 to be pivoted clockwise against the bias of spring 34 thereby deforming spring contact 50 successively into engagement with contacts 52–56. This causes current to flow in the brake circuit first with an initially low current intensity to partially apply the trailer brakes and then as spring contact 50 engages successive contacts to to increase the current intensity and application of the brakes. Continued pressure on plate 11 moves brake pedal 4 to simultaneously begin application of the tractor or car brakes to halt or retard the forward motion of the assembly.

The amount of application of the trailer brakes relative to the tractor brakes can be adjusted by turning screw 44, one direction of rotation increasing the tension of spring 34 and the resistance to movement of wall 16 in turn causes the brake pedal to move to apply the tractor brakes as pressure is applied to it. Decreasing the tension of spring 34 results in an opposite effect, it decreases the resistance that the lever 24 exerts against wall 16 and as a consequence pressure on the brake pedal causes an initially greater application of the electro-magnetic brakes prior to application of the tractor or car brakes. This is obvious from the fact that pressure applied to the brake pedal is through the medium of the bulb 7. Should it yield under pressure the brake pedal will not move or will move to a lesser extent because of the yielding of the bulb 7.

If desired, means may be provided to inject fluid under pressure into bulb 7 to take up lost motion between plate 11 of the brake pedal and wall 16. Injecting fluid into the system expands both bulbs against the elements of the chambers that confine them, assuring that pressure is immediately applied through the tubing when pressure is applied to the brake pedal. This adjustment also provides for correction of the fluid pressure under changes of temperature.

As can be seen from FIGURE 2 handle-like extension 15 may be operated by hand by grasping the protruding knobbed end and moving it against the tension of spring 34. Releasing the lever releases the brakes as the spring 34 returns it to its normal off position.

This embodiment provides an easily installed, simply adjusted trailer brake controller and one that is independent of the workable condition of the tractor brake system, and one that assures great safety.

Figures 4, 5:
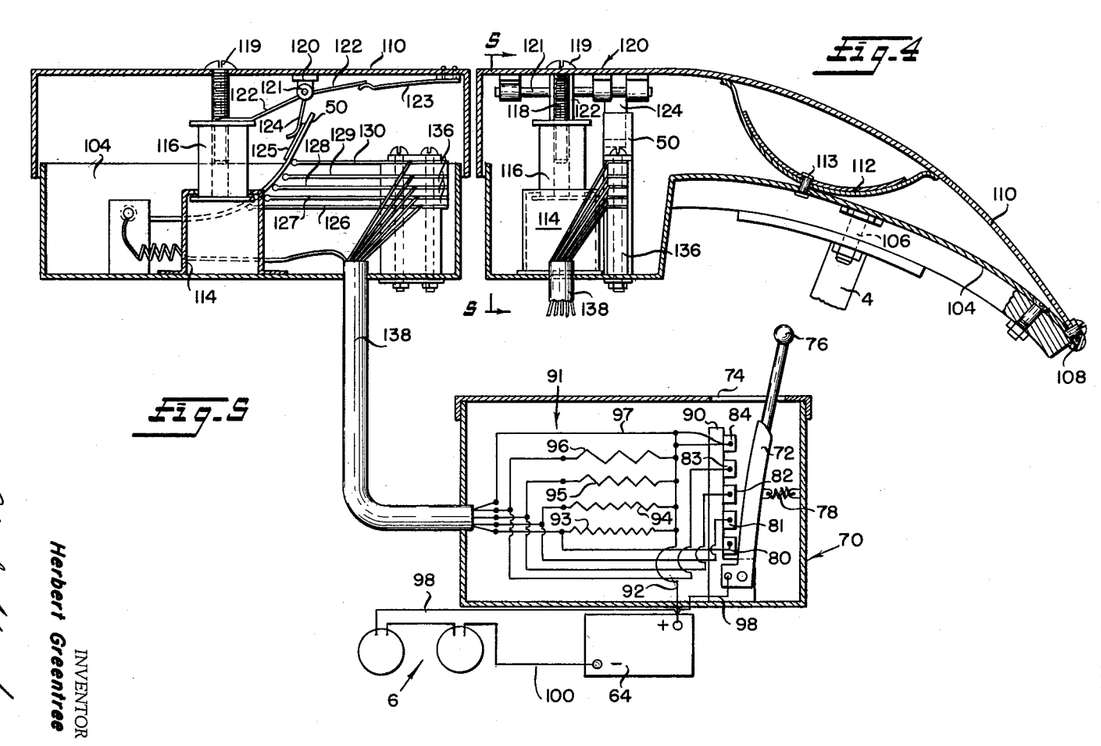
FIGURE 4 is a sectional view through the pedal supported plate assembly and contactor mechanism of another embodiment of the invention.
FIGURE 5 is a sectional view on lines 5—5 of FIGURE 4 with the remotely located controller box shown connected to the contactor mechanism.

In the embodiment of FIGURES 4 and 5, an electrical system is used to obtain the same desired mode of operation and safety features of the preceding embodiment. Instead of the fluid link between the brake pedal and spring contact 50 the embodiment of FIGURES 4 and 5 provides an electrical link. There are two contactors, one in the casing 70 mounted on the steering post or dash of the tractor or car designed for hand manipulation and the other mounted on the foot pedal 4 designed for foot manipulation. The contactors are connected to the same set of resistors and either of the contactors may be independently and selectively operated.

Casing 70 containing the hand operated contactor and the resistors for the electric brake circuit may be mounted on the steering post or other part of the vehicle near the driver. It pivotally mounts hand contactor lever 72. Lever 72 extends through slot 74 in the casing and the outer end has a knob 76 affixed thereto to be readily grasped by the hand. A tension spring 78 has one end connected to casing 70 and the other end connected to lever 72 for normally biasing the lever towards its off position disrupting the braking circuit as will presently appear.

Positioned adjacent to lever 72 and arranged for successive engagement by lever 72 is a plurality of knife type contacts 80–84. These contacts are mounted on an insulating member 90 fixed to casing 70. The individual contacts may be affixed to the insulating member 95 by rivets or screws forming points or terminals for connection thereto of the respective electrical leads.

The space behind insulating member 90 is used to house a plurality of resistors indicated generally by numeral 91, each connected at one end to a common bus 92 and at their other ends to individual contacts. The resistors preferably provide different resistances as desired. The connections and contacts are arranged such that the first contact to be engaged by lever 72 completes the brake circuit through a high resistance resistor 93 and the source of electric current 64. As each contact is successively engaged by lever 72 each of successive resistor 94 through 97 is connected in parallel to reduce the total resistance of the brake circuit and to increase the current flow through the brake means until it becomes a maximum for maximum application of the brakes.

Lever 72 is connected by conductor 98 to the brake means and buss 92 is connected to one terminal of the source of electric current 64 the other terminal of which is connected by conductor 100 to the brake means thus completing the brake circuit.

For foot operation of the electric brakes there is a plate means provided on the brake pedal 4 for engagement by the foot and through which motion of the brake pedal is compelled. The pressure applied to this plate means is arranged to connect the resistors in the brake circuit successively as the braking pressure is increased.

The plate means comprises base plate 104 fastened to the brake pedal as by through bolts 106. One edge of the base plate is provided with a groove 108 which fixedly receives one edge of an upper flexure plate 110. Upper plate 110 is biased in an upward direction by spring means 112, here illustrated as a semi-elliptical leaf spring riveted at 113 to base plate 104 with its ends extending upwardly into abutting engagement with the underside of upper plate 110. Upward movement of plate 110 is limited by an adjustable stop means that permits plate 110 to be moved downward when pressure is applied thereto.

The stop means comprises an inverted cylinder 114 attached to base plate 104 as by rivets (not shown). The upper end of cylinder 114 is inwardly flanged to reciprocally receive a second outwardly flanged cylinder 116. The cylinders slide within one another with their respective flanges cooperating to prevent relative rotation and axial separation. Cylinder 116 is provided with a centered threaded aperture to receive in threaded engagement adjustment screw 118 passing through an aperture in the upper plate and formed with a head 119 adapted to abut the aperture defining portion of plate 110 as plate 110 is biased upwardly and the cooperating flanges of the reciprocable cylinders engage. By adjusting screw 118 inwardly and outwardly of cylinder 116 the clearance between plates 104 and 110 and the tension of spring 112 may be adjusted.

The amount the plate 110 moves prior to movement of brake pedal 4 depends on the relative strengths of the springs resisting their movement. Adjustable stop means 114–119 provides a means for adjusting the tension of spring 112 relative to the tension of the spring resisting the movement of brake pedal 4. For example, as screw 118 is turned to pull upper plate 110 downwardly, there will be a compression of spring 112 increasing its initial resistance to movement toward plate 104. Rotation of screw 118 in the opposite direction lowers the tension of spring 118 permitting plate 110 to be moved more readily relative to plate 104.

Relative movement of plates 104 and 110 is effective to cause successive contact of spring contact 50 with contactors 126–130 connected in parallel to knife contacts 80 to 84 through an adjustable cam means 120 provided to compensate for adjustment of the compression of spring 112. Cam means 120 is mounted on the under side of upper plate 110 and comprises a three-armed lever 121 pivotally mounted on the underside of plate 110. All arms are integral with a hub and move about their pivot as a unit. One arm 122 has its one outer end bifurcated to embrace screw 118 and rest atop cylinder 116, while its other end extends toward upper plate 110 and overlies a biasing spring 123 (FIGURE 5) operative to yieldingly maintain arm 122 in abutting contact with cylinder 116 during all operative adjustment of the tension in spring 112. The second arm 124 extends substantially at right angles to arm 122 and engages an insulating pad 125 (FIGURE 5) on spring contact 50. Contact 50 overlies contactors 126–130 attached through insulating blocks 136 to base plate 104. Motion downwardly of upper plate 110 is transferred through cam arm 124 to deform spring contact 50 and cause it to successively engage contacts 126–130 respectively connected by the multiple leads in cable 138 to resistors 93–97 in casing 70.

Cam means 120 normally moves with plate 110 as a fixed linkage between plate 110 and spring contact 50. When the adjustable stop means is actuated to correct for the maladjustment of the two brake systems, lever 121 is moved around its pivot to move its integral arm 124 toward or away from contact 50, effecting a shortening or lengthening of the linkage between plate 110 and contact 50 as plates 104 and 110 are moved closer together or further apart.

The pressure applied to upper plate 110 compresses spring 112 and operates cam means 120 to deform spring contact 50 successively engaging the contacts 126–130 and progressively applying the trailer brakes. This increasing pressure on the brake pedal simultaneously causes the brake pedal to move and apply the tractor or car brakes in the same manner as in the previous embodiment of the invention.

Figure 6:
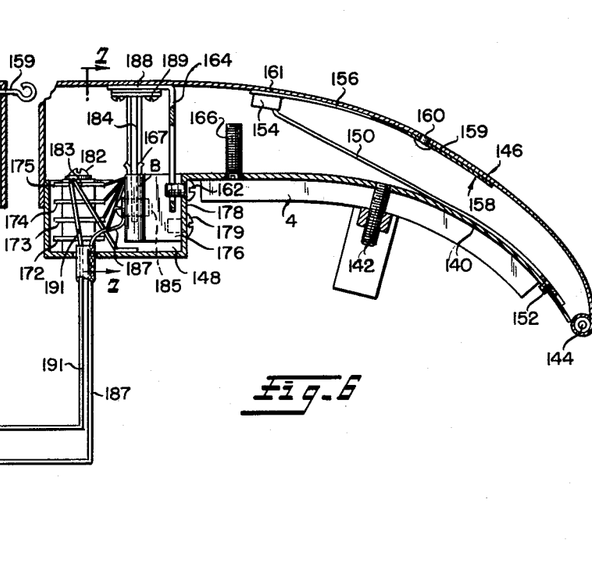
FIGURE 6 is a sectional view through a further embodiment of the invention.
Figure 7:
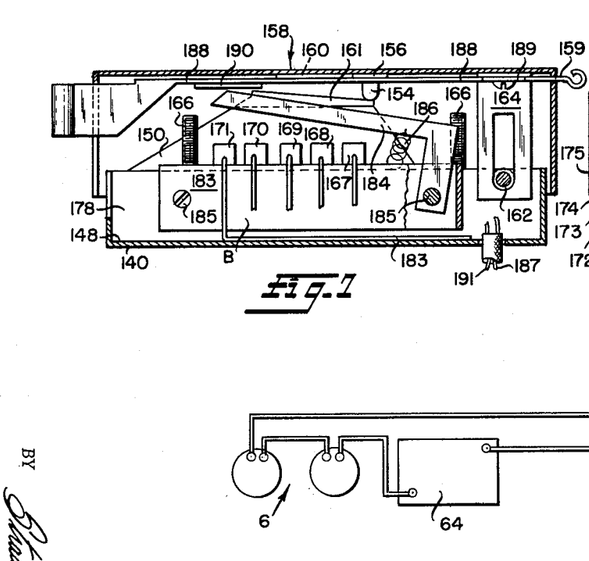
FIGURE 7 is a sectional view on line 7—7 of FIGURE 6.

A third embodiment of the invention is disclosed in FIGURES 6 and 7. In this embodiment the means for operating the controller to jointly apply the brakes on the tractor and trailer and means for independently controlling the trailer brakes is incorporated in a single structure mounted on the brake pedal requiring only an affixing of the means to the brake pedal and a connection of two wires, one to the source of electric current and the other to the trailer brakes.

This embodiment provides a base plate 140 attached to the brake pedal by studs 142 and formed to provide a piano type hinge pivot 144 for an upper plate 146 and a well 148 housing the controller elements.

Upper plate 146 hinged at 144 extends over the brake pedal and overlies well 148 providing a movable cover for the controller. Downward motion of upper plate 146 is resisted by a plate-like leaf spring 150 riveted at 152 to base plate 140. A laterally adjustable camming means 154 is disposed between the upturned free end of spring 150 and the under side of upper plate 146. Camming means 154 is in the form of a metal block mounted on the outer end of one arm 156 of a bell crank lever 158 the other arm 159 of which extends beyond one side boundary of plate 146 to be grasped and moved for adjusting the tension of the spring 150. Bell crank lever 158 is mounted for pivotal movement on a pivot pin 160 fixed to plate 146.

As best shown in FIGURE 7, the free end of spring 150 is bent into a plane substantially at right angles to the main body of the spring and is inclined to provide a camming surface 161 with which block 154 engages. As bell crank lever 158 is rotated, clockwise around its pivot as viewed in FIGURE 7, the block rides upwardly along camming surface 161 of spring 150 to increase the initial tension of spring 150. Motion of bell crank 150 in the opposite direction results in a decrease in the initial tension of spring 150. By this adjustment the relative degree of braking as between the tractor and trailer brake systems may be effected as previously pointed out.

Upward relative movement of upper plate 146 is limited by a screw 162 threaded into the well housing and passing through a slotted bar 164 depending from the under side of the plate 146. Stop screws 166 are also provided for limiting the downward motion of the plate 146.

The controller switch consists of a plurality of knife contacts 167–171 mounted in spaced relation along an insulating strip 176 fixed to a side wall 178 of well 148 by screws 179. Beside the switch and in well 148, there is mounted a plurality of resistors 172, 173, 174 and 175 having one terminal of each connected to a buss 182 and the other terminal connected to the respective contacts. Contact 171 is directly connected to buss 182 by lead 183. A knife blade contact 184 of bell crank shape is pivoted at the free end of one arm to one of screws 185 threaded into insulating strip 176 and securing a U-shaped journal and contact support bracket B thereto. The other arm of blade contact 184 overlies the plurality of contacts 167–171 and is adapted upon downward movement to successively engage the contacts. Blade contact 184 is biased toward its upper disconnect position by compression spring means 186 (FIGURE 7) acting between the under edge of blade contact 184 and abutting at its other end the top edge of bracket B. Screw 185 serving as the pivot for blade contact 184 is directly connected to one terminal of the source of electrical energy by lead 187.

On the underside of the plate 146 overlying blade contact 184 there is a spring-like actuator member 188. Member 188 is clamped at one end to plate 146 as shown by clamp plate and screw assembly 189 (FIGURE 6) and extends beyond the other side of the plate 146 to form a hand hold whereby it may be deflected downwardly relative to plate 146. The underside of the member 188 carries a strip of insulation 190 (FIGURE 7) against which the upper end of the blade contact 184 engages when lever member 188 is manually depressed to force blade contact 184 into contact with the contacts 167–171.

The resilient character of member 188 permits the blade contact 184 to be actuated independently of applying pressure to the brake pedal and thus permits the testing of the trailer brakes and the application of the trailer brakes independently of the tractor brakes 14 when desired.

The buss 182 is connected by lead 191 to the other terminal of the source of electric current through the electric magnetic brakes as in the previously described embodiments.

As in the previously described embodiments of the invention pressure applied to the brake pedal through the mechanism mounted thereon first applies the trailer brakes and then simultaneously applies both the trailer and tractor brakes. Successive engagement of the contacts 167–171 by blade contact 184 is effective to cause the current to increase in the electro-magnetic means that actuates the trailer brakes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A control system for trailer wheel brakes of a tractor-trailer assembly wherein the tractor and trailer have independent braking systems comprising
   a brake pedal and a first source of brake power on said tractor for applying said tractor brakes,
   a second source of brake power independent from said first source of brake power for applying said trailer brakes,
   controller means intermediately connected between the second source of brake power and the trailer brakes for pre-actuating said trailer brakes and normally regulating the power applied to the trailer brakes to assure predetermined controlled actuation of said trailer and tractor brakes,
   means responsive to foot pressure applied to actuate the brake pedal for actuating said controller comprising yieldable means mounted on said brake pedal for motion relative thereto, and
   motion transmitting means connecting said yieldable means to said controller.

2. The control system of claim 1 wherein said motion transmitting means comprises
   a collapsible fluid chamber means forming a part of and collapsible by said yieldable means,
   an expandible fluid chamber means at said controller connected to move in response to collapse of said collapsible chamber means
   and a non-expansible, non-compressible fluid link between said chamber means.

3. The control system of claim 1 wherein said means for actuating said controller comprises
   yieldable means mounted on said brake pedal for motion relative thereto, and
   mechanical means connected with said yieldable means and movable therewith engaging said controller for moving said controller to apply the trailer brakes.

4. The control system of claim 1 wherein said means for actuating said controller includes operable means effective irrespective of the operativeness of said tractor brakes.

5. The control system of claim 1 wherein said controller is mounted on a tractor part adjacent the driver and includes means for actuating said controller independently of said first mentioned means for actuating said controller.

6. The control system of claim 1 wherein said controller is mounted on and carried by said brake pedal and includes means for actuating said controller independently of said first mentioned means for actuating said controller.

7. A control system for electro-magnetic trailer brakes of a tractor trailer assembly having indepenent wheel brakes for the tractor vehicle comprising
   a brake pedal and a first source of brake power operatively connected to a first actuator for the tractor brakes;
   a second source of brake power having an electrical contactor including a series of stationary resistors of varying resistance having contacts arranged in a path for successive engagement by a movable contactor,
   a movable contactor, and
   actuator means independent of said first actuator fixed to said foot pedal and normally biased to a non-actuating position for actuating said movable contactor, said actuator means being movable toward its full braking position in accord with foot pressure applied by the operator to said foot pedal.

8. The control system of claim 5 wherein said actuator means is biased to its non-actuating position spaced from the foot engaged portion of said foot pedal actuator by a biasing means having an increasing resistance to relative movement of said actuator means and said brake pedal as said actuator means approaches full braking position whereby the trailer brakes are initially engaged upon normal braking action of the driver prior to application of said tractor brakes and thereafter are applied with continuing greater force as the brake pedal actuator applies said tractor wheel brakes.

9. The control system of claim 5 wherein said actuator means includes means operative to apply said trailer brakes fully in event of failure of said tractor brakes.

10. A control system for the tractor and trailer brakes of a tractor-trailer assembly, said tractor and trailer having independent brake systems: a brake pedal and a source of brake power for applying said tractor brakes, a source of electric power for applying said trailer brakes, and a controller and circuits connecting said controller to said source of electric power and to said trailer brakes including;
   (a) a plurality of resistors,
   (b) hand operable lever means to actuate said contactor means, and
   (c) actuator means for actuating said hand operable means by means of foot pressure on said brake pedal during the application of the tractor brakes comprising:
      (1) a flexible fluid bulb mounted on said brake pedal through which pressure is to be applied to said brake pedal,
      (2) a second flexible fluid bulb operably associated with said hand operable lever, and
      (3) tubing means connecting said flexible bulbs whereby pressure applied to said brake pedal will cause the fluid in said first bulb to flow to said second bulb and expand it against said hand operable lever to apply said trailer brakes.

11. A control system for the tractor and trailer brakes of a tractor-trailer assembly, said tractor and trailer having independent brake systems: a brake pedal for applying said tractor brakes, a source of electric power for applying said trailer brakes, and a controller for applying said electric power to said trailer brakes comprising;
   (a) a plurality of resistors of increasing resistance arranged to be connected in parallel to apply said electric power in graduated steps to said trailer brakes, and
   (b) a hand operable means for successively connecting said resistors in parallel to apply said electric power,
foot actuated means for successively connecting said resistors in parallel to apply said electric brakes comprising:
   (a) a yieldable member mounted on the foot engaged portion of said brake pedal,
   (b) spring means biasing said yieldable member to an inoperative position,
   (c) means for adjusting the compression of said spring means,
   (d) contactor means, and
   (e) linkage means between said yieldable means and said contactor, whereby said contactor means is operated by said yieldable means to successively connect said resistors in parallel to apply said trailer brakes prior to said tractor brakes and thereafter to apply said tractor and trailer brakes wtih increasing force.

12. The control system as set forth in claim 11 wherein said means for adjusting the compression of said spring means includes:
   means for adjustably limiting the upward movement of the yieldable means under the action of said spring means to determine the residual compression of said spring,
   and means responsive to the adjustment of said means for limiting the upward movement of said yieldable means for compensating for a change of range of movement effected by said adjustment by altering the effective length of said linkage means and the mechanical advantage thereof.

13. A control system for the tractor and trailer brakes of a tractor-trailer assembly said tractor and said trailer having independent braking systems: a brake pedal and a source of power for applying the tractor brakes, a source of electric power for applying the trailer brakes, and means mounted on said brake pedal for controlling the application of said electric power to said trailer brakes when said tractor brakes are being applied comprising;
   (a) a plurality of resistors of increasing resistance,
   (b) a circuit including said source of electric power connecting said resistors in parallel to said trailer brakes.
   (c) manually operable contactor means responsive to foot pressure applied to actuate the brake pedal for successively connecting said resistors in said circuit,
   (d) yieldable means mounted on said brake pedal and movable relative thereto
   (e) means for resisting the movement of said yieldable means in proportion to the extent of relative motion thereof,
   (f) means for adjusting said means for resisting movement to regulate the movement of the yieldable means relative to the movement of the brake pedal, and
   (g) contactor means actuated by said yieldable means for successively connecting said resistors in parallel and effecting gradual application of electric power to said trailer brakes.

14. The control system as set forth in claim 11 wherein the means for adjusting the means resisting the movement of the yieldable means comprises
   a leaf spring fixed at one end,
   a cam surface on the other end of said spring, and
   block means between said yieldable means and said cam surface adjustably movable along said cam surface for flexing said spring relative to said yieldable means to adjust the resisting force exerted thereby.

15. A controller for the trailer brakes of a tractor-trailer assembly having electromagnetic trailer brakes responsive to a source of electrical energy and foot pedal actuated tractor brakes responsive to an independent source of brake power comprising
   a series of resistors connected in parallel in a circuit adapted for insertion in a circuit including said electromagnetic brakes and said source of electrical energy,
   contactor means for successively energizing said series of resistors to progressively increase the electrical energy supplied to said electromagnetic brakes and
   means responsive to the foot pressure applied to said foot pedal for initially actuating said contactor means to apply said trailer brakes and thereafter progressively and simultaneously increasing the application of said trailer brakes as said tractor brakes are applied.

16. The controller of claim 15 wherein said means responsive to the foot pressure applied to said foot pedal comprises:
   a plate assembly including a mounting plate adapted for attachment to the tread of the foot pedal and an actuator plate hingedly connected to said mounting plate,
   adjustable means biasing said actuator plate away from said mounting plate whereby the initial actuating foot pressure may be varied to relate the sequence of operation of the tractor and trailer brakes to assure application of the trailer brakes ahead of the tractor brakes and thereafter greater application of the trailer brakes until maximum application of the tractor and trailer brakes occurs.

17. The controller of claim 16 wherein said adjustable means comprises an expansible and compressible fluid bulb.

18. The controller of claim 16 wherein said adjustable means comprises:
   a biasing spring, and means for selectively tensioning said biasing spring to vary its initial resistance to movement of said actuator plate toward said mounting plate.

19. The controller of claim 18 wherein said series of resistors and said contactor means are mounted on said mounting plate.

20. The controller of claim 18 wherein said contactor means is mounted on said mounting plate and electric leads extend from said mounting plate to said series of resistors remotely located with respect to said brake pedal.

21. The system of claim 1 wherein said independent braking systems include braking means operable independent of operation of the engine of said tractor.

22. The system of claim 1 wherein said independent braking systems include actuation means which are separately synchronically actuatable at a single position.

References Cited in the file of this patent

UNITED STATES PATENTS

| | | |
|---|---|---|
| 1,880,958 | Farmer | Oct. 4, 1932 |
| 2,045,886 | Tibbetts | June 30, 1936 |
| 2,165,320 | Weiss et al. | July 11, 1939 |
| 2,452,033 | Born | Oct. 26, 1948 |
| 2,834,434 | Stuart | May 13, 1958 |

FOREIGN PATENTS

| | | |
|---|---|---|
| 103,981 | Australia | May 17, 1938 |

UNITED STATES PATENT OFFICE
CERTIFICATE OF CORRECTION

Patent No. 3,135,358                                  June 2, 1964

Herbert Greentree

It is hereby certified that error appears in the above numbered patent requiring correction and that the said Letters Patent should read as corrected below.

Column 2, line 22, for "of", second occurrence, read -- to --; column 3, line 17, for "Bulk" read -- Bulb --; column 4, line 2, for "said" read -- and --; column 7, lines 49 and 50, for "electric" read -- electro- --; column 8, line 45, for "indepenent" read -- independent --; column 10, line 3, for "brakes." read -- brakes, --.

Signed and sealed this 3rd day of November 1964.

(SEAL)
Attest:

ERNEST W. SWIDER                                      EDWARD J. BRENNER
Attesting Officer                                         Commissioner of Patents